3,515,228
DRILLING APPARATUS
William P. Henson, Indianapolis, Ind., assignor to Mobile Drilling Company, Inc., Indianapolis, Ind., a corporation of Indiana
Filed Feb. 14, 1969, Ser. No. 799,273
Int. Cl. E21c *11/02*
U.S. Cl. 173—43                    5 Claims

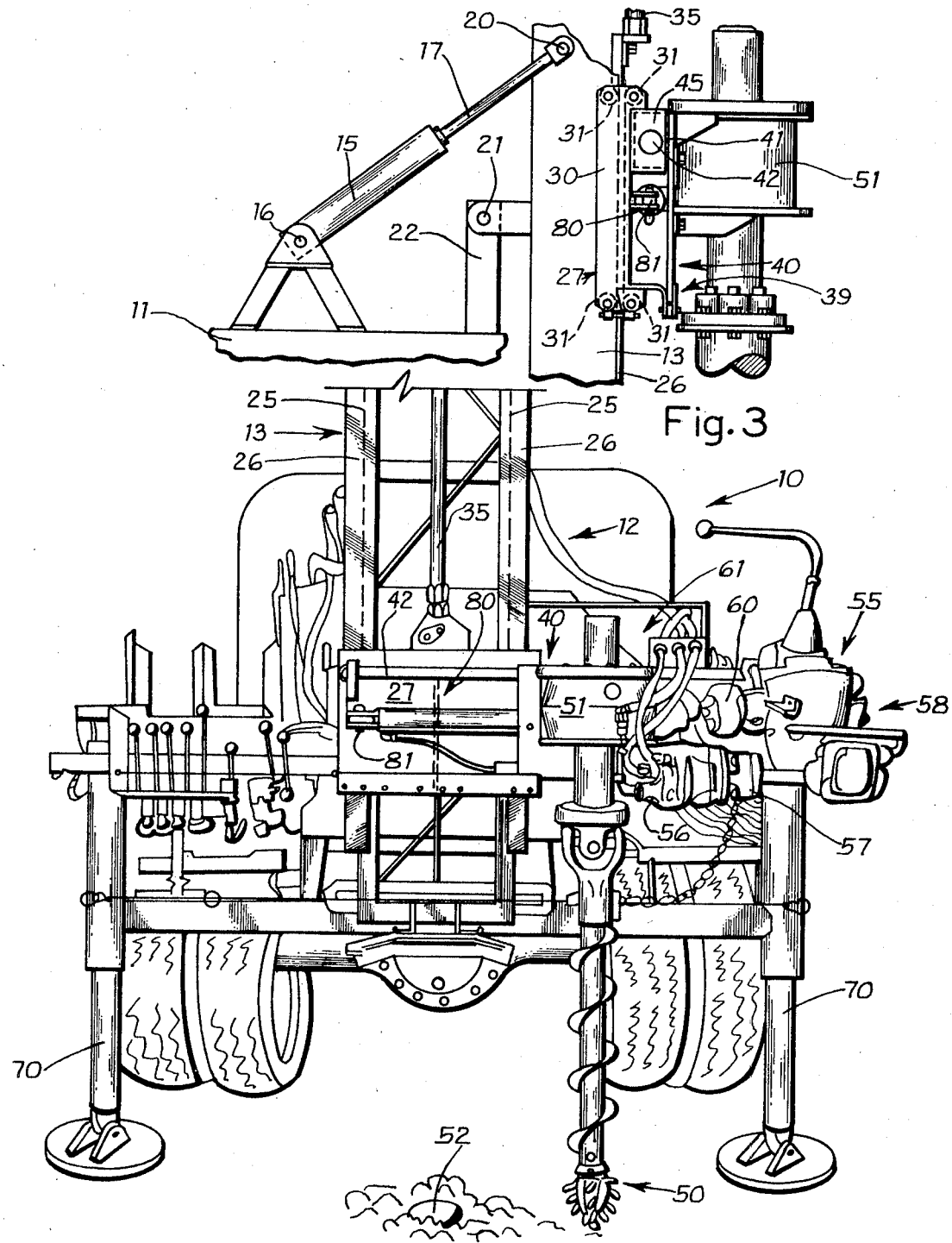

ABSTRACT OF THE DISCLOSURE

A truck mounted drilling arrangement including a tower mounted on the bed of the truck and a vertically movable first carriage mounted on the tower. The drill and drill head are mounted upon a second carriage which is slidably mounted for horizontal movement on said first carriage. A hydraulic cylinder is connected between the first and second carriage and operates to slide the second carriage horizontally to move the drill and drill head away from the space above a hole being drilled by the drilling arrangement.

BACKGROUND OF THE INVENTION

Field of the invention

The field of the invention is drilling apparatus such as the type used in taking samples of the earth.

Description of the prior art

There are presently available vehicle mounted drilling apparatus which is usable by persons such as contractors, highway and bridge builders, soils laboratories and the like to take samples of the soil. Such soil sampling can involve the adding and removing of tool sections, for example, to drill a relatively deep hole or to take a core sample from the soil. It is desirable in such situations to be able to easily and conveniently move the drill and drill head horizontally away from a position directly above the hole. The apparatus presently available for accomplishing such movement requires substantial truck bed area and also requires a very expensive tower as well as offsetting of the crown sheave at the top of the tower so that the crown sheave will be above the hole when the drill is moved away from the hole. Such a crown sheave is used to remove the sections, tools and samples from the hole. Also such presently available apparatus requires the movement of substantial weight which requires substantial power.

SUMMARY OF THE INVENTION

One embodiment of this invention might include in a vehicle mounted drilling arrangement including a vehicle, an elongated tower mounted on said vehicle and movable to a position wherein said tower extends generally parallel to the direction of the desired hole to be drilled, a first carriage mounted on said tower for movement longitudinally thereof, and first power means mounted on said tower for forcing said carriage longitudinally of said tower; the improvement which comprises: a guide bar fixedly mounted on said carriage and extending perpendicularly of the length of said tower, a second carriage slidably mounted on said guide bar for movement thereon perpendicular to the length of said tower, a drill head mounted on said second carriage and adapted to mount a drill, means for driving said drill head mounted on said carriage, and second power means connected between and acting between said first carriage and said second carriage for moving said second carriage relative to said first carriage.

One object of this invention is to provide improved drilling apparatus.

Another object is to provide drilling apparatus making possible horizontal movement of the drill head without the use of substantial truck bed clearance.

A further object is to provide drilling apparatus of the present type wherein the crown sheave does not have to be offset making the tower stronger and less expensive to build.

Still another object is to provide drilling apparatus which requires a relatively small amount of power for horizontal movement of the drill head.

Related objects and advantages will become apparent as the description proceeds.

BRIEF DESCRIPTION OF THE DRAWINGS

FIG. 2 is a view similar to FIG. 1 showing the apparatus in a different operating position.

FIG. 3 is a side elevation of certain apparatus illustrated in FIGS. 1 and 2.

DESCRIPTION OF THE PREFERRED EMBODIMENTS

Figures 1, 4:
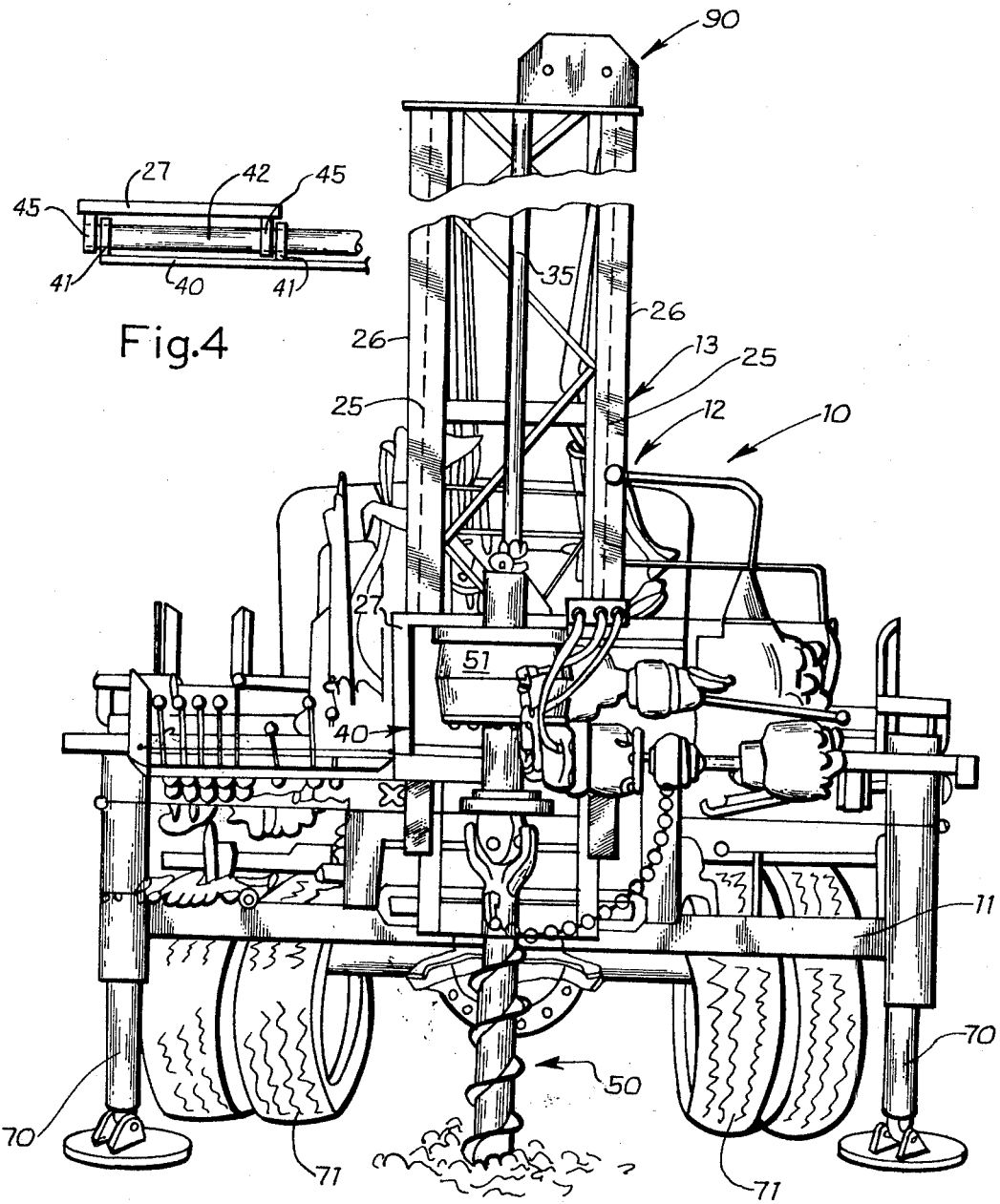
FIG. 1 is a rear elevation of a truck mounted drilling apparatus embodying the present invention.
FIG. 4 is a top view of certain portions of the structure illustrated in FIGS. 1–3 but with various details removed for clarity and to illustrate the operation of the apparatus.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a truck 10 having mounted on the truck bed 11 thereof a drilling apparatus 12. The drilling apparatus includes a tower 13 which is shown in FIG. 3 as mounted on the truck bed 11 so that it can be swung into the vertical position illustrated in FIGS. 1, 2 and 3 and can also be swung into a somewhat horizontally extending position by retracting of a hydraulic cylinder 15 which is pivotally mounted at 16 on the truck bed 11 and which has its piston 17 pivotally mounted at 20 to the tower 13. Thus, by retracting the piston 17 of the hydraulic cylinder, the tower can be swung to a forwardly projecting position over the truck bed and cab of the truck for movement on the road. In its normal operating position the tower 13 is vertical although it may also be located at other angles for drilling at an angle. It will be noted that the tower 13 is pivotally mounted at 21 to a mount 22 extending vertically upwardly from the truck bed 11.

As shown in FIGS. 1 and 2 the tower 13 includes a pair of spaced vertically extending members 25 each of which has an outwardly projecting flange 26. The first carriage 27 is mounted for vertical movement on the tower 13 and includes a pair of rearwardly projecting portions 30 (only one shown) on the inside of which are mounted four rollers 31. The four rollers 31 roll on the opposite sides of the outwardly projecting flange 26 for each vertical movement on the tower 13.

A hydraulic cylinder 35 is fixedly mounted on the tower 13 and is connected to the first carriage 27 for vertical movement of the first carriage. A second carriage 40 is mounted on the first carriage 27 for horizontal movement. The second carriage 40 has fixed thereto a pair of blocks 41 which are spaced apart a substantial distance as shown in FIG. 4. The two blocks 41 are slidably mounted upon a guide rod 42 which is fixed to the first carriage 27 by means of a pair of spaced blocks 45. It can be seen from FIG. 4 that the mounting of the carriage 40 in this fashion permits rightward movement of the carriage away from position of FIGS. 1 and 4 to the position of FIG. 2 so that the drill 50 mounted on the drill head 51 can be moved rightwardly away from the space over the hole 52. It will be noted that the lower end of the carriage 40 is received within a cup shaped guide rail 39 which is spaced from the guide rod 42. The guide rail 39 is fixed to the carriage 27 and provides firm mounting for the carriage 40.

The drill head 51 is fixedly mounted upon the carriage 40 as is the associated means 55 for driving the drill head. The means 55 includes in the illustrated embodiment the fluid motor 56 which might be for example a model number MID 117 manufactured by Denison Division of Abex Corporation of Columbus, Ohio. The motor 56 drives through a flexible coupling 57 which might be for example a standard roller or chain flexible coupling manufactured by Diamond Chain model number D5016. The output of the flexible coupling is connected into an auxiliary transmission 58 which is a model T-9 with PTO manufactured by Warner Gear of Muncie, Ind. The transmission 58 is used differently from its normal operation in that the input of the transmission 58, as it is used in the present apparatus, is normally the auxiliary output thereof. The normal output of the transmission is used as the output in the present embodiment while the normal input is unconnected. The output of the transmission 58 is connected to a further flexible coupling 60 which might be for example a Diamond Chain flexible coupling D60018A which is in turn connected to a bevel gear drive assembly 61 which is manufactured by the Hub City Manufacturing Company of Aberdeen, S. Dak. The bevel gear drive assembly 61 makes up the drill head and converts the horizontal drive from the flexible coupling 60 to the vertical drive for the drill 50.

It will be noted in FIGS. 1 and 2 that the truck is equipped with jacks 70. These jacks are used to support the rear of the truck in a raised position from the normal support provided by the wheels 71, thus providing a stable support for the operation of the structure on the bed of the truck.

As mentioned, the second carriage 40 is slidably mounted upon the first carriage 27. The hydraulic cylinder motor 80 has its piston connected to the carriage 40 for moving it rightwardly and leftwardly as viewed in FIGS. 1 and 2. The hydraulic cylinder motor 80 is connected to the carriage 27 by pin means 81. It can be seen that by removing the drill 50 from the hole 52 the drill and drill head can be moved rightwardly as shown in FIG. 2 away from the position over the hole 52. A crown sheave 90 is shown mounted at the top of the tower 13 in FIG. 1. The crown sheave can then be used to lift tooling out of the hole or to lower tooling down into the hole. Of course, the normal use of the crown sheave 90 is to lift structure out of the hole 52 after the drill head has been detached from the drill 50 and the drill head has been moved to the rightward position illustrated in FIG. 2. When the drill head is in the rightward position illustrated in FIG. 2, a free passage between the crown sheave 90 and the tooling in the hole 52 is provided.

It will be evident from the above description that the present invention provides an improved drilling apparatus. Thus, an operator using the apparatus of the present invention might be operating his apparatus so as to take a sample 15 or 20 times an hour. It can be appreciated that if it were necessary for the operator to lift the jacks 70 and move the truck forwardly in order to provide a free space over the hole 52, substantial time would be lost in the operation. It can also be appreciated that the present invention is an improvement over existing apparatus for moving the drill head in that the crown sheave need not be offset and can be mounted at the top of a straight vertical tower. It will also be evident that the drilling apparatus of this invention makes possible horizontal movement of the drill head without the use of substantial truck bed clearance, thus making possible the mounting of additional equipment on the truck bed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

I claim:

1. In a vehicle mounted drilling arrangement including a vehicle, an elongated tower mounted on said vehicle and movable to a position wherein said tower extends generally parallel to the direction of the desired hole to be drilled, a first carriage mounted on said tower for movement longitudinally thereof, and first power means mounted on said tower for forcing said carriage longitudinally of said tower; the improvement which comprises: a guide bar fixedly mounted on said carriage and extending perpendicularly of the length of said tower, a second carriage slidably mounted on said guide bar for movement thereon perpendicular to the length of said tower, a drill head mounted on said second carriage and adapted to mount a drill, means for driving said drill head mounted on said carriage, and second power means connected between and acting between said first carriage and said second carriage for moving said second carriage relative to said first carriage.

2. The drilling arrangement of claim 1 additionally comprising a guide rail fixedly mounted on said first carriage and extending in parallel relation to said guide bar, said second carriage being slidably mounted on said guide rail for movement perpendicular to the length of said tower, said guide bar and guide rail being spaced apart to firmly mount said second carriage on said first carriage.

3. The drilling arrangement of claim 2 wherein said guide bar is fixed to said first carriage by a pair of spaced mounting blocks, said second carriage having fixed thereto a pair of spaced mounting blocks which are slidably received on said guide bar, said second power means being a hydraulic cylinder motor including a cylinder element and a piston element with one of said elements secured to said first carriage and one of said elements secured to said second carriage, said guide bar being spaced above said guide rail, said guide rail having a cup shaped configuration positioned below said second carriage and receiving the lower edge of said second carriage.

4. The drilling arrangement of claim 3 wherein said tower is positioned so that its length extends vertically, said first carriage being movable vertically on said tower, a drill mounted on said drill head, said second carriage being movable horizontally on said first carriage to move said drill and drill head away from a hole drilled by said drill.

5. The drilling arrangement of claim 1 wherein said guide bar is fixed to said first carriage by a pair of spaced mounting blocks, said second carriage having fixed thereto a pair of spaced mounting blocks which are slidably received on said guide bar, said second power means being a hydraulic cylinder motor including a cylinder element and a piston element with one of said elements secured to said first carriage and one of said elements secured to said second carriage.

References Cited

UNITED STATES PATENTS

| | | | |
|---|---|---|---|
| 2,655,006 | 10/1953 | Hoen et al. | 173—43 X |
| 2,832,567 | 4/1958 | Fletcher et al. | 173—23 X |
| 2,985,250 | 5/1961 | Goodrich et al. | 173—43 X |

ERNEST R. PURSER, Primary Examiner

U.S. Cl. X.R.

173—23, 28